US009353283B2

(12) United States Patent
Voigt et al.

(10) Patent No.: US 9,353,283 B2
(45) Date of Patent: May 31, 2016

(54) ARTICLE COATED WITH A COMPOSITION COMPRISING POLYETHYLENE PREPARED WITH A SINGLE SITE CATALYST

(75) Inventors: Björn Voigt, Hisings Backa (SE); Martin Anker, Hisings Kärra (SE); Magnus Palmlöf, Västra Frölunda (SE); Solveig Johansson, Stenungsund (SE)

(73) Assignee: BOREALIS AG, Vienna (AT)

( * ) Notice: Subject to any disclaimer, the term of this patent is extended or adjusted under 35 U.S.C. 154(b) by 923 days.

(21) Appl. No.: 13/140,342

(22) PCT Filed: Nov. 25, 2009

(86) PCT No.: PCT/EP2009/008396
§ 371 (c)(1),
(2), (4) Date: Jun. 16, 2011

(87) PCT Pub. No.: WO2010/075914
PCT Pub. Date: Jul. 8, 2010

(65) Prior Publication Data
US 2011/0250374 A1 Oct. 13, 2011

(30) Foreign Application Priority Data
Dec. 31, 2008 (EP) .................................... 08022586

(51) Int. Cl.
| | | |
|---|---|---|
| B32B 1/08 | (2006.01) |
| B05D 3/10 | (2006.01) |
| C09D 123/06 | (2006.01) |
| C09D 123/08 | (2006.01) |
| C09D 123/04 | (2006.01) |
| C08L 23/04 | (2006.01) |
| C08L 23/06 | (2006.01) |

(52) U.S. Cl.
CPC ............... *C09D 123/04* (2013.01); *C08L 23/04* (2013.01); *C08L 23/06* (2013.01); *C09D 123/06* (2013.01); *Y10T 428/1393* (2015.01)

(58) Field of Classification Search
CPC ..... C08L 23/04; C08L 23/06; C08L 2666/06; C08L 2205/00; C08L 2314/06; C09D 123/00; C09D 123/04; C09D 123/06; Y10T 428/1393; Y10T 428/31938
USPC ........ 428/36.9, 36.91, 36.92, 35.7, 35.8, 425, 428/8; 524/585; 138/140; 427/302
See application file for complete search history.

(56) References Cited

U.S. PATENT DOCUMENTS

| | | |
|---|---|---|
| 7,081,285 B1 | 7/2006 | Barre et al. |
| 7,153,909 B2 * | 12/2006 | Van Dun et al. .............. 525/240 |
| 2007/0254990 A1 | 11/2007 | Lewoniuk et al. |

FOREIGN PATENT DOCUMENTS

| | | |
|---|---|---|
| EP | 0129368 A | 12/1984 |
| EP | 0260130 A1 | 3/1988 |
| EP | 0423101 A2 | 4/1991 |
| EP | 0537130 A1 | 4/1993 |
| EP | 0836608 A1 | 4/1998 |
| EP | 1316598 A1 | 6/2003 |
| WO | 94/14856 A1 | 7/1994 |
| WO | 95/12622 A1 | 5/1995 |
| WO | 96/00243 A1 | 1/1996 |
| WO | 96/32923 A2 | 10/1996 |
| WO | 97/28170 A1 | 8/1997 |
| WO | 98/46616 A1 | 10/1998 |
| WO | 98/49208 A1 | 11/1998 |
| WO | 98/56831 A1 | 12/1998 |
| WO | 99/12981 A1 | 3/1999 |
| WO | 99/19335 A1 | 4/1999 |
| WO | 99/51646 A1 | 10/1999 |
| WO | 00/34341 A2 | 6/2000 |
| WO | 01/30861 A | 5/2001 |
| WO | 2004/067654 A1 | 8/2004 |
| WO | 2006/045550 A1 | 5/2006 |
| WO | 2008/051824 A2 | 5/2008 |

OTHER PUBLICATIONS

International Search Report for International Application No. PCT/EP2009/008396.
Written Opinion of the International Searching Authority and International Preliminary Report on Patentability for International Application No. PCT/EP2009/008396.

* cited by examiner

*Primary Examiner* — Yan Lan
(74) *Attorney, Agent, or Firm* — Roberts Mlotkowski Safran & Cole, P.C.

(57) ABSTRACT

The present invention relates to an article coated with a composition comprising (A) an ethylene homo- or copolymer resin which has been prepared by using a single-site catalyst further characterized in that component (A) has an $MFR_{21}$, measured according to ISO 1133 at 190° C. and under a load of 21.6 kg, from 0.01 to 20 g/10 min. The present invention further relates to an article coated with a composition comprising (A) an ethylene homo- or copolymer resin which has been prepared by using a single-site catalyst further characterized in that component (A) has an impact strength at −40° C. of at least 80 kJ/m$^2$ in a Charpy notched test according to ISO ISO 179-1/1eA:2000 with a pendulum energy of 15 J. The invention is furthermore directed to the use of the composition for the coating of an article.

9 Claims, No Drawings

ARTICLE COATED WITH A COMPOSITION COMPRISING POLYETHYLENE PREPARED WITH A SINGLE SITE CATALYST

The present invention relates to an article coated with a composition comprising a polyethylene resin prepared with a single site catalyst.

It is especially advantageous for the coating or lining of pipes, especially steel pipes. In the context of this application the term "coating" includes the lining of pipes.

The exploration and exploitation of oil and gas fields in the Arctic region becomes feasible and also profitable owing to the global warming and the subsequent melting of the ice sheets.

However, the flowlines required to transport the gas and oil have to have a good low temperature stability to be suitable for the use in the Arctic region. Thus, also the coating and/or lining of articles used to transport the oil, especially pipes has to withstand the low temperatures.

WO 04/67654 describes a coating composition suitable for metal pipes which comprises a multimodal ethylene polymer obtained with a metallocene catalyst. However, the problem of low temperature resistance is not addressed in WO 04/67654.

It is thus an object of the present invention to provide an article coated with a composition, said composition having a good low temperature stability and further shows good processability, such as extrudability, and good mechanical properties, such as improved abrasion resistance and can be simply and cost-efficiently prepared.

It has surprisingly been found that the object of the present invention can be achieved by using an ethylene homo- or copolymer prepared with a single site catalyst.

Therefore, the present invention provides in a first embodiment an article coated with a composition comprising
(A) an ethylene homo- or copolymer resin which has been prepared by using a single-site catalyst
further characterized in that
component (A) has an $MFR_{21}$, measured according to ISO 1133 at 190° C. and under a load of 21.6 kg, from 0.01 to 20 g/10 min.

In the first embodiment the invention is furthermore directed to the use of a composition comprising
(A) an ethylene homo- or copolymer resin which has been prepared by using a single-site catalyst
further characterized in that
component (A) has an $MFR_{21}$, measured according to ISO 1133 at 190° C. and under a load of 21.6 kg, from 0.01 to 20 g/10 min for the coating of an article.

The present invention further provides in a second embodiment an article coated with a composition comprising
(A) an ethylene homo- or copolymer resin which has been prepared by using a single-site catalyst
further characterized in that
component (A) has an impact strength at −40° C. of at least 80 kJ/m² in a Charpy notched test according to ISO ISO 179-1/1eA:2000 with a pendulum energy of 15 J.

In the second embodiment the invention is furthermore directed to the use of a composition comprising
(A) an ethylene homo- or copolymer resin which has been prepared by using a single-site catalyst
further characterized in that
component (A) has an impact strength at −40° C. of at least 80 kJ/m² in a Charpy notched test according to ISO 179-1/1eA:2000 with a pendulum energy of 15 J.
for the coating of an article.

The composition used for the coating of an article according to the first, and the second embodiment of the present invention has a good low temperature stability and further shows good processability, such as extrudability, and good mechanical properties, such as improved abrasion resistance and can be simply and cost-efficiently prepared.

Preferably, in the first embodiment component (A) has an impact strength at −40° C. of at least 80 kJ/m² in a Charpy notched test according to ISO 179-1/1eA:2000 with a pendulum energy of 15 J.

Preferably, in the second embodiment component (A) has an $MFR_{21}$, measured according to ISO 1133 at 190° C. and under a load of 21.6 kg, from 0.01 to 20 g/10 min.

In the following, preferred ways to carry out the first and the second, embodiment, of the current invention are described.

Preferably the article is a pipe, even more preferably the article is a steel pipe.

Preferably the composition is used for the coating of pipes, preferably steel pipes or as topcoat material for pipes used for transport of gas, oil, etc., preferably steel pipes used for transport of gas, oil, etc.

The numbering of chemical groups, as used herein, is in accordance with the IUPAC system in which the groups of the periodic system of the elements are numbered from 1 to 18.

Furthermore, wherever herein the term "polyolefin" (or "polyethylene") is used both olefin homo- or copolymers (or ethylene homo- or copolymers) are meant.

The total amount of all of the polymer components of the composition the coating is consisting of are denoted as "base resin".

Preferably the amount of the base resin is at least 90 wt. %, more preferably at least 95 wt. %, even more preferably at least 97.5 wt. % and most preferably 100 wt. % of the coating.

Preferably the amount of component (A) is not less than 80 wt. %, more preferably not less than 85 wt. %, even more preferably not less than 90 wt. % and most preferably not less than 95 wt. % of the base resin.

Preferably the amount of component (A) is not more than 99.5 wt. %, more preferably not more than 98 wt. % and most preferably not more than 95 wt. % of the base resin.

Thus, the composition the coating is consisting of may comprise further polymer components apart from component (A) in the prescribed amount of at least 80 wt. %.

Further, preferably (A) has a comonomer content from 0 to 5.0 mol %, more preferably from 0 to 3.5 mol %, even more preferably from 0 to 2.0 mol %, even more preferably from 0 to 1.0 mol % based on the total amount of (A), most preferably component (A) is an ethylene homopolymer.

Component (A) may comprise as comonomer any compound which includes unsaturated polymerizable groups.

Preferably the comonomer(s) used for the production of (A) are $C_3$- to $C_{20}$-alpha-olefins e.g. propene, but-1-ene, hex-1-ene, 4-methyl-pent-1-ene, oct-1-ene etc., more preferably $C_4$- to $C_{10}$-alpha-olefins and most preferably $C_6$- to $C_8$-alpha-olefins, e.g. hexene.

Preferably (A) has a density of at least 920 kg/m³, more preferably of at least 930 kg/m³, even more preferably of at least 940 kg/m³ and most preferably of at least 945 kg/m³.

Further, preferably (A) has a density of not more than 970 kg/m³, more preferably of not more than 960 kg/m³, even more preferably of not more than 955 kg/m' and most preferably of not more than 950 kg/m³.

Preferably (A) has an $MFR_5$ measured according to ISO 1133 at 190° C. and under a load of 5.0 kg of at least 0.01 g/10 min, more preferably of at least 0.05 g/10 min, even more preferably of at least 0.10 g/10 min, even more preferably of at least 0.15 g/10 min and most preferably of at least 0.20 g/10 min.

Further preferably, (A) has an MFR$_5$ measured according to ISO 1133 at 190° C. and under a load of 5.0 kg of not more than 10 g/10 min, even more preferably of not more than 5.0 g/10 min, even more preferably of not more than 3.0 g/10 min, more preferably of not more than 2.0 g/10 min, even more preferably of not more than 1.0 g/10 min and most preferably of not more than 0.7 g/10 min.

Preferably, (A) has an MFR$_{21}$ measured according to ISO 1133 at 190° C. and under a load of 21.6 kg of at least 0.1 g/10 min, more preferably of at least 0.5 g/10 min, and most preferably of at least 1 g/10 min.

Further preferably, (A) has a MFR$_{21}$ measured according to ISO 1133 at 190° C. and under a load of 21.6 kg of not more than 15 g/10 min, more preferably not more than 10.0 g/10 min, even more preferably of not more than 5.0 g/10 min, even more preferably of not more than 3.0 g/10 min and most preferably of not more than 2.5 g/10 min.

Preferably (A) has a weight average molecular weight (M$_w$) of at least 50,000 g/mol, more preferably of at least 100,000 g/mol, even more preferably of at least 150,000 g/mol and most preferably of at least 200,000 g/mol.

Further, preferably (A) has a weight average molecular weight (M$_w$) of not more than 500,000 g/mol, more preferably of not more than 400,000 g/mol, even more preferably of not more than 325,000 g/mol and most preferably of not more than 300,000 g/mol.

Preferably (A) has a number average molecular weight (M$_n$) of at least 35,000 g/mol, more preferably of at least 50,000 g/mol, even more preferably of at least 65,000 g/mol and most preferably of at least 80,000 g/mol.

Further, preferably (A) has a number average molecular weight (M$_n$) of not more than 200,000 g/mol, more preferably of not more than 175,000 g/mol, even more preferably of not more than 150,000 g/mol and most preferably of not more than 125,000 g/mol.

Preferably, (A) has a molecular weight distribution (MWD) of at least 1.5 and most preferably of at least 2.

Further, preferably, (A) has a molecular weight distribution (MWD) of not more than 5, more preferably of not more than 4, even more preferably of not more than 3.5 and most preferably of less than 3.0.

Preferably, component (A) has an impact strength at −40° C. of at least 100 kJ/m$^2$ in a Charpy notched test according to ISO 179-1/1eA:2000 with a pendulum energy of 15 J, more preferably of at least 120 kJ/m$^2$ and most preferably of at least 130 kJ/m$^2$.

Preferably, component (A) has an impact strength at −20° C. of at least 80 kJ/m$^2$ in a Charpy notched test according to ISO 179-1/1eA:2000 with a pendulum energy of 15 J, more preferably of at least 100 kJ/m$^2$, even more preferably of at least 120 kJ/m$^2$ and most preferably of at least 130 kJ/m$^2$.

Preferably, component (A) has an impact strength at 0° C. of at least 80 kJ/m$^2$ in a Charpy notched test according to ISO 179-1/1eA:2000 with a pendulum energy of 15 J, more preferably of at least 100 kJ/m$^2$, even more preferably of at least 120 kJ/m$^2$ and most preferably of at least 130 kJ/m$^2$.

Preferably, component (A) has an impact strength at 23° C. of at least 80 kJ/m$^2$ in a Charpy notched test according to ISO 179-1/1eA:2000 with a pendulum energy of 15 J, more preferably of at least 100 kJ/m$^2$, even more preferably of at least 120 kJ/m$^2$ and most preferably of at least 130 kJ/m$^2$.

Usually component (A) has an impact strength at any of the above-given temperatures of not more than 250 kJ/m$^2$ in a Charpy notched test according to ISO 179-1/1eA:2000 with a pendulum energy of 15 J.

Preferably, component (A) has a tensile stress at break determined at −45° C. of at least 35 MPa, more preferably of at least 40 MPa and most preferably of at least 45 MPa. Usually, component (A) has a tensile stress at break determined at −45° C. of not more than 100 MPa.

Preferably, component (A) has a tensile strain at break determined at −45° C. of at least 250%, more preferably of at least 300% and most preferably of at least 350%. Usually, component (A) has a tensile strain at break determined at −45° C. of not more than 700%.

Preferably, component (A) has a tensile stress at yield determined at −45° C. of not less than 40 MPa. Usually, component (A) has a tensile stress at yield determined at −45° C. of not more than 80 MPa.

Preferably, component (A) has a tensile strain at yield determined at −45° C. of at least 6.5%, more preferably of at least 7.0%. Usually, component (A) has a tensile strain at yield determined at −45° C. of not more than 20%.

Preferably, component (A) has a tensile stress at break determined at 23° C. of at least 30 MPa. Usually, component (A) has a tensile stress at break determined at 23° C. of not more than 601 MPa.

Preferably, component (A) has a tensile strain at break determined at 23° C. of at least 700%. Usually, component (A) has a tensile strain at break determined at 23° C. of not more than 1500%.

Preferably, component (A) has a tensile stress at yield determined at 23° C. of not less than 25 MPa. Usually, component (A) has a tensile stress at yield determined at 23° C. of not more than 60 MPa.

Preferably, component (A) has a tensile strain at yield determined at 23° C. of at least 9.0%, more preferably of at least 10.0%. Usually, component (A) has a tensile strain at yield determined at 23° C. of not more than 20%.

Preferably the Taber abrasion of (A) measured according to ASTM D 4060 is not more than 10 mg/1000 cycles, more preferably is not more than 8.0 mg/1000 cycles, even more preferably is not more than 6.0 mg/1000 cycles, even more preferably is not more than 5.0 mg/1000 cycles and most preferably is not more than 4.5 mg/1000 cycles.

Preferably the Ball cratering wear coefficient is not more than $3.5 \cdot 10^{-4}$ mm$^3$/mN, more preferably is not more than $3.3 \cdot 10^{-4}$ mm$^3$/mN, even more preferably is not more than $3.1 \cdot 10^{-4}$ mm$^3$/mN and most preferably is not more than $2.9 \cdot 10^{-4}$ mm$^3$/mN.

Preferably a metallocene compound is used as single site catalyst for the production of (A). More preferably, a metallocene compound of formula I is used

$$((Cp)_m R_n)MX_2 \qquad (I)$$

wherein:
each Cp independently is an optionally substituted and/or optionally fused homo- or heterocyclopentadienyl ligand;
R is a bridge between the Cp groups of 1-7 bridging atoms;
M is a transition metal of Group 3 to 10;
each X is —CH$_2$—Y, wherein Y is C$_{6-20}$-aryl, C$_{6-20}$-heteroaryl, C$_{1-20}$-alkoxy, C$_{6-20}$-aryloxy, —NR'$_2$, —SR', —PR'$_3$, —SiR'$_3$, —OSiR'$_3$ or halogen;
R' is C$_{1-20}$-hydrocarbyl or in case of —NR'$_2$, the two substituents R' can form a ring together with the nitrogen atom wherein they are attached to; and each non-cyclopentadienyl ring moiety can further be substituted;

m is 1 or 2;

n is 0, 1 or 2;

wherein m+2 is equal to the valence of M and a cocatalyst, e.g. a fluoroborate cocatalyst or aluminoxane cocatalyst, preferably an aluminoxane cocatalyst.

Said optional substituent(s) present on the Cp groups are independently selected from halogen, hydrocarbyl (e.g. $C_{1-20}$-alkyl, $C_{2-20}$-alkenyl, $C_{2-20}$-alkynyl, $C_{3-12}$-cycloalkyl, $C_{6-60}$-aryl or $C_{7-20}$-arylalkyl), $C_{3-12}$-heterocycloalkyl, $C_{5-20}$-heteroaryl, $C_{1-20}$-haloalkyl, —$SiR''_3$, —$OSiR''_3$, —$SR''$, —$PR''_2$ or —$NR''_2$, each $R''$ is independently a hydrogen or hydrocarbyl, e.g. $C_{1-20}$-alkyl, $C_{2-20}$-alkenyl, $C_{2-20}$-alkynyl, $C_{3-12}$-cycloalkyl or $C_{6-20}$-aryl; or especially in case of —$NR''_2$, the two substituents $R''$ can form a ring, e.g. five- or six-membered ring, together with the nitrogen atom wherein they are attached to.

The bridging group R between Cp groups, where present is preferably a bridge of 1 to 4 bridging C-atoms and 0 to 3 bridging heteroatoms, wherein the heteroatom(s) can be e.g. Si, Ge and/or O atom(s), whereby each of the bridge atoms may bear independently substituents, such as hydrogen, $C_{1-20}$-alkyl, tri($C_{1-20}$-alkyl)silyl, tri($C_{1-20}$-alkyl)siloxy, $C_{6-20}$-aryl or $C_{6-20}$-arylalkyl substituents; or a bridge of 1-3, e.g. one or two, bridging heteroatoms, such as silicon, germanium and/or oxygen atom(s), e.g. —$SiR^1_2$—, wherein each $R^1$ is independently $C_{1-20}$-alkyl, $C_{6-20}$-aryl or tri($C_{1-20}$-alkyl)silyl residue, such as trimethylsilyl-.

Cp preferably denotes cyclopentadienyl, indenyl, tetrahydroindenyl or fluorenyl optionally substituted as defined above. The Cp group may further bear a fused ring of 3 to 7 atoms, e.g. 4, 5 or 6 atoms, which ring may be aromatic, saturated or partially saturated such as a benzindenyl (e.g. 4,5-benzindenyl). More preferably Cp denotes cyclopentadienyl or indenyl.

The subscript m is preferably 1 or 2, especially 2. When m is 2 it is preferred that the Cp groups are based on the same $\eta^5$-ligand structure, e.g. both optionally substituted cyclopentadienyls or optionally substituted indenyls as defined above. More preferably, when m is 2, both Cp groups will be the same, i.e. carry the same substituents.

More preferably each Cp group remains unsubstituted or independently bears 1, 2, 3, 4 or 5 substituents as defined above, more preferably 1, 2, 3 or 4, e.g. 1 or 2 substituents. Preferred substituents include $C_{1-20}$-alkyl, $C_{6-20}$-aryl, $C_{7-20}$-arylalkyl (wherein the aryl ring alone or as a part of a further moiety may further be substituted as indicated above, e.g. substituted by $C_{1-20}$-alkyl), or —$OSi(C_{1-20}$-hydrocarbyl)$_3$.

Especially preferably the Cp groups carry 1 to 5 $C_{1-6}$-alkyl substituents such as methyl, ethyl, isopropyl or n-butyl or —$OSi(C_{1-20}$-alkyl)$_3$ such as —OSidimethyl-tert-butyl.

The subscript n is preferably 1 or 0, i.e. the metallocene is either bridged or unbridged. When n represents 1, m should represent 2 and the bridge between the Cp groups should preferably be between the 1-positions on the Cp rings.

Further more preferred options for R, if present, are a methylene, ethylene or a silyl bridge, whereby the silyl can be substituted as defined above. Preferred silyl bridges are =$SiR^1_2$ where each $R^1$ is independently $C_{1-6}$-alkyl, tri($C_{1-6}$-alkyl)siloxy, tri($C_{1-6}$-alkyl)silyl or $C_{6-10}$-aryl, e.g. dimethylSi=, (trimethylsilyl)(methyl)Si= or (methyl)(phenyl)Si=. Most preferably R, if present, is a dimethylsilyl or ethylene bridge.

M is a transition metal of Group 3 to 10, preferably of Group 4 to 10, more preferably of Group 4 to 6, even more preferably Group 4 or Cr, even more preferably Ti, Zr or Hf, most preferably Hf.

Each X is —$CH_2$—Y. Preferably, each Y is independently selected from $C_{6-20}$-aryl, $NR'_2$, —$SiR'_3$ or —$OSiR'_3$ wherein R' is as defined above. Most preferably —$CH_2$—Y is benzyl or —$CH_2$—$SiR'_3$. Preferred R' or R'' groups are $C_{1-6}$-alkyl, e.g. methyl, ethyl, isopropyl, n-butyl, isobutyl, t-butyl or $C_{6-10}$-aryl.

In the metallocene compounds of the invention, if Cp is optionally substituted cyclopentadienyl, then n is preferably 0, and if Cp is optionally substituted indenyl, then n is preferably 1.

As specific examples e.g. bridged or, preferably, unbridged bis(mono-,di- or trialkyl substituted cyclopentadienyl) ligands complexed with Zr, Ti or Hf can be mentioned.

Hence, more preferably metallocene compounds of formula (II) are used for the production of (A).

(II)

(I)

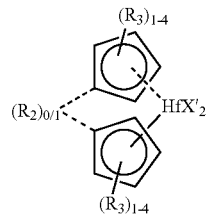

wherein $R_2$ represents an optionally present 1 to 4 atom bridge, e.g. ethylene or dimethylsilyl bridge, each $R_3$ is a $C_{1-6}$-alkyl or siloxy substituent (e.g. as described above), and both X' groups are either benzyl (Bz) or $CH_2SiR'_3$ wherein R' is as hereinbefore defined.

Preferably a compound of formula (II) is used wherein $R_2$ is absent, $R_3$ is methyl, ethyl, n-propyl, i-propyl, n-butyl, i-butyl, t-butyl, preferably n-butyl or n-propyl and 1 or 2 substituents are present on each Cp ring, preferably 1 substituent. X' is benzyl or $CH_2SiR'_3$ wherein R' is preferably $C_{1-6}$-alkyl, especially methyl wherein R' is as hereinbefore defined.

Further preferably a compound of one of the following formulas (III) or (IV) is used $(Cp')_2R_{0/1}HfBz_2$     (III)

$(Cp')_2R_{0/1}Hf(X^1)(CH_2SiR'_3)$     (IV)

wherein each Cp' denotes a mono- or di-$C_{1-6}$-alkyl-substituted cyclopentadienyl, R and R' are as herein before defined, e.g. a 1 to 4 atom bridge optionally comprising heteroatoms, $X^1$ is halogen, $C_{1-20}$-hydrocarbyl or —$CH_2$—Y wherein Y is as hereinbefore defined and Bz represents benzyl. R, if present is preferably ethylene or dimethylsilyl, although in a most preferred embodiment of both formulae (III) and (IV) R is absent. In formula (IV), $X^1$ is preferably —$CH_2$—Y, especially —$CH_2SiR'_3$. Preferably R' is $C_{1-6}$-alkyl, especially methyl, e.g. $X^1$ is —$CH_2SiMe_3$.

Particularly preferred are the following compounds:

bis(n-butylcyclopentadienyl)Hf dibenzyl,
bis(methylcyclopentadienyl)Hf dibenzyl,
bis(1,2-dimethylcyclopentadienyl)Hf dibenzyl,
bis(n-butylindenyl)Hf dibenzyl,
bis(methylindenyl)Hf dibenzyl,
bis(dimethylindenyl)Hf dibenzyl,
bis(n-propylcyclopentadienyl)Hf dibenzyl,
bis(i-propylcyclopentadienyl)Hf dibenzyl,
bis(1,2,4-trimethylcyclopentadienyl)Zr dibenzyl, dimethylsilylbis(2-methyl-4,5-benzindenyl)Zr dibenzyl,
rac-dimethylsilylbis(2-methyl-4-fluorenyl)Zr dibenzyl,
bis(n-butylcyclopentadienyl)Hf $(CH_2SiMe_3)_2$,
bis(n-propylcyclopentadienyl)Hf $(CH_2SiMe_3)_2$,
bis(i-propylcyclopentadienyl)Hf $(CH_2SiMe_3)_2$,
bis(1,2,4-trimethylcyclopentadienyl)Zr $(CH_2SiMe_3)_2$,
dimethylsilylbis(2-methyl-4,5-benzindenyl)Zr $(CH_2SiMe_3)_2$,
rac-dimethylsilylbis(2-methyl-4-fluorenyl)Zr $(CH_2SiMe_3)_2$, In the definitions above, preferably any alkyl, alkenyl or alkynyl residue (with up to 20 C-atoms) referred to above alone or as a part of a moiety may be linear or branched, and preferably contains up to 9, more preferably up to 6 carbon atoms. $C_{6-20}$-aryl is preferably phenyl or naphthyl, preferably phenyl. $C_{1-20}$-hydrocarbyl includes $C_{1-20}$-alkyl, $C_{6-20}$-aryl, $C_{2-20}$-alkenyl or $C_{2-20}$-alkynyl. Halogen means F, Cl, Br or I, preferably Cl. The term $C_{5-20}$-heteroaryl may contain e.g. 1, 2 or 3, preferably 1 or 2 heteroatoms selected from N, O or S, preferably N (e.g. pyridyl). Bridged metallocenes may exist in rac- or meso-forms or mixtures thereof and can be separated using conventional techniques known in the art.

The preparation of the metallocenes of the invention can be carried out according or analogously to the methods known from the literature and is within skills of a person skilled in the field. Thus for the preparation see e.g. EP-A-129 368, examples of compounds wherein the metal atom bears a —NR"$_2$ ligand see inter alia WO-A-9856831 and WO-A-0034341. For the preparation see also e.g. in EP-A-260 130, WO-A-9728170, WO-A-9846616, WO-A-9849208, WO-A-9912981, WO-A-9919335, EP-A-836608, WO-A-9856831, WO-A-00/34341, EP-A-423 101 and EP-A-537 130.

Preferably, the single-site catalyst comprises a cocatalyst. Said cocatalysts are known in the art.

Metallocene procatalysts are generally used as part of a catalyst system which also includes an ionic cocatalyst or catalyst activator (herein generally cocatalyst), for example, an aluminoxane (e.g. methylaluminoxane (MAO), hexaisobutylaluminoxane and tetraisobutylaluminoxane) or a boron compound (e.g. a fluoroboron compound such as triphenylpentafluoroboron or triphenylcarbenium tetrakis-(pentafluorophenyl)borate $(C_6H_5)_3C^+B(C_6F_5)_4$.

Alumoxanes are well known in the art and can be made by conventional methods. Traditionally, the most widely used aluminoxane is methylaluminoxane (MAO), an aluminoxane compound in which the R groups are methyls. For aluminoxanes with higher alkyl groups reference is made to hexaisobutylalumoxane (HIBAO).

As mentioned above, the olefin polymerisation catalyst system of the invention comprises (i) a procatalyst formed from a metallated compound of formula (I) and (ii) a cocatalyst. The cocatalyst compound is preferably an aluminoxane, most preferably MAO, isobutylalumoxane, e.g. TIBAO (tetraisobutylalumoxane) or HIBAO (hexaisobutylalumoxane). The metallocene procatalyst and cocatalyst may be introduced into the polymerization reactor separately or together or, more preferably they are pre-reacted and their reaction product is introduced into the polymerization reactor.

If desired the procatalyst, procatalyst/cocatalyst mixture or a procatalyst/cocatalyst reaction product may be used in unsupported form or it may be solidified together with other catalyst forming components and used as such. Alternatively, the metallocene procatalyst or its reaction product with the cocatalyst can be introduced into the polymerization reactor in supported form, e.g. impregnated into a porous particulate support.

The particulate support material may be an organic or inorganic material, e.g. an organic polymer or pseudo metal oxide such as silica, alumina, titania or zirconia or a mixed oxide such as silica-alumina, silica-titania in particular silica, alumina or silica-alumina.

Preferably the support is a porous material so that the metallocene may be loaded into the pores of the support, e.g. using a process analogous to those described in WO94/14856 (Mobil), WO95/12622 (Borealis), WO96/32923 (Borealis) and WO96/00243 (Exxon). The particle size is not critical but is preferably in the range 5 to 200 μm, more preferably 20 to 80 μm.

If desired, further catalyst forming components, e.g. further activators, may be used in a manner known in the art.

Where an organoaluminium alkylating agent is used, this is preferably used in a quantity sufficient to provide a loading of at least 0.1 mmol Al/g carrier, more preferably at least 0.5 mmol Al/g, even more preferably at least 0.7 mmol Al/g, even more preferably at least 1.4 mmol Al/g carrier, and still more preferably 2 to 3 mmol Al/g carrier. Where the surface area of the carrier is particularly high, higher aluminium loadings may be needed. Thus for example particularly preferred aluminium loadings with a surface area of 300-400 $m^2$/g carrier may range from 0.5 to 3 mmol Al/g carrier. The active metal (i.e. the metal of the procatalyst) is preferably loaded onto the support material at from 0.1 to 4%, preferably 0.1 to 1.0%, especially 0.1 to 0.5%, by weight metal relative to the dry weight of the support material.

The use and amounts of the metallocene compounds and the cocatalyst are within the skills of the artisan. The quantities employed may vary depending on the particular loading conditions and may be chosen in a manner well known to the skilled person.

Where an aluminoxane or boron activator is used, the mole ratio of the cocatalyst to the metallocene is preferably from 0.1:1 to 10000:1, more preferably from 1:1 to 50:1 and most preferably from 1:2 to 30:1. More preferably, where an alumoxane cocatalyst is used, then for an unsupported catalyst the aluminium:metallocene metal (M) molar ratio is preferably from 2:1 to 10000:1 and more preferably from 50:1 to 1000:1. Where the catalyst is supported the Al:M molar ratio is preferably from 2:1 to 10000:1 and more preferably from 50:1 to 400:1. Where a borane cocatalyst (catalyst activator) is used, the B:M molar ratio is preferably from 2:1 to 1:2, more preferably from 9:10 to 10:9 and most preferably 1:1. When a neutral triarylboron type cocatalyst is used the B:M molar ratio is preferably from 1:2 to 500:1, however some aluminium alkyl would normally also be used. When using ionic tetraaryl-borate compounds, it is preferred to use carbonium rather than ammonium counterions or to use a B:M molar ratio below 1:1.

Usually single-site catalysts yield relatively narrow molecular weight distribution polymers compared with other types of catalysts, e.g. Ziegler-Natta catalysts.

Preferably a catalyst as described above is used in the process of the invention.

Polymerization in the process of the invention may be effected in one polymerization reactor, using conventional polymerization techniques, e.g. gas phase, solution phase, slurry or bulk polymerization. The process of the invention may also comprise a prepolymerisation step. However, preferably a prepolymerisation step is not applied.

For slurry reactors, the reaction temperature will generally be in the range 60 to 110° C., preferably 70 to 100° C.; the reactor pressure will generally be in the range 5 to 80 bar, preferably 30 to 80 bar and most preferably 40 to 70 bar; and the residence time will generally be in the range 0.3 to 5 hours, preferably 0.5 to 2 hours. The diluent used will generally be an aliphatic hydrocarbon having a boiling point in the range −70 to +100° C. In such reactors, polymerization may if desired be effected under supercritical conditions.

For gas phase reactors, the reaction temperature used will generally be in the range 60 to 115° C., preferably 70 to 110° C.; the reactor pressure will generally be in the range 10 to 25 bar; and the residence time will generally be 1 to 8 hours. The gas used will commonly be a non-reactive gas such as nitrogen or low boiling point hydrocarbons such as propane together with monomer (e.g. ethylene).

The gas phase may also be run in gas phase condensed mode as is well known in the art.

Generally the quantity of catalyst used will depend upon the nature of the catalyst, the reactor types and conditions and the properties desired for the polymer product. Conventional catalyst quantities, such as described in the publications referred to herein, may be used. Hydrogen may be employed as is known in the art.

Preferably a catalyst as described above is used in the process of the invention.

Preferably, component (A) is unimodal, i.e. not multimodal.

The modality of a polyethylene resin according to the present invention can be determined according to known methods. A multimodal molecular weight distribution (MWD) is reflected in a gel permeation chromatography (GPC) curve exhibiting two or more component polymers wherein the number of component polymers corresponds to the number of discernible peaks, or one component polymer may exist as a hump, shoulder or tail relative to the MWD of the other component polymer.

A unimodal ethylene polymer can also be obtained in a multi-stage process using two or more reactors coupled in series when a metallocene catalyst is used and slightly different reaction conditions in each reaction stage are applied.

Moreover, the composition may further contain various additives, such as miscible thermoplastics, further stabilizers, lubricants, fillers, colouring agents and foaming agents, which can be added before, during or after the blending step (i) to the composition. The amount of said additives is usually below 10 wt. %, preferably below 7 wt. %, more preferably below 3 wt. % and most preferably below 1 wt. % based the composition.

The coating of the article may be carried out by well-known methods, as for example described in EP 1 316 598.

All publications referred to herein are hereby incorporated by reference. The invention will now be illustrated by reference to the following non-limiting examples.

Definition of Measurement Methods

Charpy Impact Strength

Non-Instrumented Test from Compression Moulded Specimen

Charpy impact strength was determined according to ISO 179-1/1eA:2000 on V-notched samples at −40° C. (Charpy impact strength (−40° C.)), pendulum energy=15 J, failure type C.

The test specimens were compression moulded samples of multipurpose type B (ISO 3167), with a thickness of 4 mm. Average cooling rate was 15 K/min (ISO 1872-2).

Density:

Density of the polymer was measured according to ISO 1183/D, the sample preparation is made according to ISO 1872-2B.

Melt Flow Rate (MFR)

The melt flow rate (MFR) is determined according to ISO 1133 and is indicated in g/10 min. The MFR is an indication of the melt viscosity of the polymer. The MFR is determined at 190° C. for PE and at 230° C. for PP. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Molecular Weight Distribution and Average Molecular Weights:

The weight average molecular weight $M_w$ and the molecular weight distribution ($MWD=M_w/M_n$ wherein $M_n$ is the number average molecular weight and $M_w$ is the weight average molecular weight) is measured by a method based on ISO 16014-4:2003. An Alliance 2000 GPCV instrument, equipped with refractive index detector and online viscosimeter was used with 3×HT6E styragel columns from Waters (styrene-divinylbenzene) and 1,2,4-trichlorobenzene (TCB, stabilized with 250 mg/l 2,6-di-tert-butyl-4-methyl-phenol) as solvent at 140° C. and at a constant flow rate of 1 ml/min. 500 µl of sample solution were injected per analysis. The column set was calibrated using universal calibration (according to ISO 16014-2:2003) with 10 narrow MWD polystyrene (PS) standards in the range of 1.05 kg/mol to 11 600 kg/mol. Mark Houwink constants were used for polystyrene and polyethylene (K: $19 \times 10^{-3}$ dl/g and a: 0.655 for PS, and K: $39 \times 10^{-3}$ dl/g and a: 0.725 for PE). All samples were prepared by dissolving 0.5-3.5 mg of polymer in 4 ml (at 140° C.) of stabilized TCB (same as mobile phase) and keeping for 2 hours at 140° C. and for another 2 hours at 160° C. with occasional shaking prior sampling in into the GPC instrument.

Comonomer Content

This has been measured with Fourier transform infrared spectroscopy (FTIR) calibrated with $^{13}$C-NMR.

Tensile Test

Tensile strength properties were determined according to ISO 527-2. Compression moulded specimens of type 1A were used, which were prepared according to ISO 1872-2.

Strain at Yield/Strain at Break:

Strain at yield (in %) was determined according to ISO 527-2. The measurement was conducted at −45° C. and 23° C. temperature with an elongation rate of 50 mm/min.

Stress at Yield/Stress at Break:

Stress at yield (in MPa) was determined according to ISO 527-2. The measurement was conducted at −45° C. and 23° C. temperature with an elongation rate of 50 mm/min.

Tensile Break:

Tensile break was determined according to ISO 527-2. The measurement was conducted at −45° C. and 23° C. temperature with an elongation rate of 50 mm/min.

Abrasion Resistance

The Taber abrasion was measured according to ASTM D 4060.

The specimen is a 2 mm thick 100×100 mm² compression moulded plaque having a hole with 6.3 mm diameter at the centre. The specimen has been thermostated for at least 24 hours at 23° C. temperature and 50% relative humidity. The test is done by using CS-17 abrasion wheel. The wheel is adjusted by placing the specimen in the device and running the wheel 50 cycles. The specimen is then carefully cleaned and weighed after which the specimen is placed in the testing device and the test is started. The wear index (I) is calculated as:

$$I = \frac{(A-B) \cdot 1000}{C}$$

where A=weight of the specimen before the abrasion, B=weight of the specimen after the abrasion and C=number of abrasion cycles. The adjustment of the wheel is done at the beginning of each test and after 500 cycles.

Ball Cratering Wear Measurement

The Ball cratering wear coefficient was measured according to Wear, Vol. 229, p. 205.

A plaque with a thickness of 1 mm is compression molded and a circular specimen with a diameter of 20 mm is cut out from the plaque.

Example 1

Synthesis of Benzyl Potassium 200 mmol (23.1 g) t-BuOK (Potassium tert-butoxide, Fluka 60100, 97%, CAS 865-47-4, mp 256-258° C.) was dissolved in 250 ml toluene. 86 ml n-BuLi (n-Butyllithium, 2.5 M solution in hexanes, Aldrich 23, 070-7, d 0.693, CAS 109-72-8) (2.32 mol/L) was added during 1.5 hours. The mixture turned from white to red. The mixture was stirred for 2.5 days. Filtration and wash with toluene (5×100 ml) and pentane (50 ml) afforded 21.7 g benzylpotassium as brick red, toluene insoluble solid.

$^1$H-NMR in THF-$d_8$, δ(ppm): 6.01 (m, 2H), 5.10 (d, 2H), 4.68 (t, 1H), 2.22 (s, 2H). Chemical shifts are referenced to the solvent signal at 3.60 ppm. $^{13}$C-NMR in THF-$d_8$, δ(ppm): 152.3, 129.4, 110.1, 94.3, 51.6. Chemical shifts are referenced to the solvent signal at 66.50 ppm (the middle peak).

Synthesis of (n-BuCp)$_2$Hf(CH$_2$Ph)$_2$ 6.87 mmol (3.38 g) (n-BuCp)$_2$HfCl$_2$ (Witco TA2823) and 150 ml of toluene were mixed at 20° C. to give brown-grey solution. 13.74 mmol (1.79 g) benzylpotassium was added to the solution at 0° C. as a solid during 10 minutes. The cooling bath was removed and the mixture was stirred at 20° C. for 3 hours. Solvent was removed under reduced pressure and the remainder was extracted with 3×30 ml of pentane. The solvent was removed from the combined pentane solutions giving 3.86 g of (n-BuCp)$_2$Hf(CH$_2$Ph)$_2$ as yellow liquid. Yield 93%.

$^1$H-NMR in toluene-$d_8$, δ(ppm): 7.44 (t, 4H), 7.11 (d, 4H), 7.08 (t, 2H), 5.75 (m, 4H), 5.67 (m, 4H), 2.33 (t, 4H), 1.77 (s, 4H), 1.54 (m, 4H), 1.43 (m, 4H), 1.07 (t, 6H) Chemical shifts are referenced to the solvent signal at 2.30 ppm (the middle peak). $^{13}$C-NMR in toluene-$d_8$, δ(ppm): 152.7, 137.5, 128, 126.8, 121.6, 112.7, 110.5, 65.3, 34.5, 29.7, 22.8, 14.1. Chemical shifts are referenced to the solvent signal at 20.46 ppm (the middle peak). Elemental analysis: C, 63.57% (calc. 63.72); H, 6.79% (calc. 6.68); Hf, 29.78% (calc. 29.59); K<0.1% (calc. 0).

Preparation of Catalyst:

Complex solution of 0.13 ml toluene, 66 mg (n-BuCp)$_2$Hf(CH$_2$Ph)$_2$ and 4.83 ml of 30 wt. % MAO in toluene was prepared. Pre-contact time 70 minutes. Prepared complex solution was added slowly onto of on 1.9989 g activated silica SP9-391 (Grace silica carrier) Contact time 3 h at 24° C. Drying with nitrogen purge 3 h at 50° C. Ready made catalyst has Al/Hf=200 mol/mol; Hf 0.40 wt. %.

Production of Examples 1 and 2 and Comparative Example 3

The single-site catalyst as described above has been used for the production of Examples 1 and 2 and Comparative Example 3. The process parameters are given in Table 1 below.

Comparative Example 4

The polymer has been produced with a prepolymerized Ziegler-Natta catalyst prepared according to WO 99/51646, example 3 in a loop and a gas-phase reactor. The process parameters are given in Table 1 below.

The properties of the resulting polymers are given in table 2.

TABLE 1

|  |  | Example 1 | Example 2 | Comparative Example 3 | Comparative Example 4 |
|---|---|---|---|---|---|
| prepolymerization ethylene homopolymer | | | | | |
| Temperature | [° C.] | Not in use | Not in use | Not in use | 50 |
| pressure | [bar] | | | | 65 |
| MFR$_5$ | [g/10 min] | | | | 0.5 |
| Split | | | | | 1 |
| loop reactor ethylene homopolymer | | | | | |
| temperature | [° C.] | 85 | 85 | 85 | 95 |
| pressure | [bar] | 58 | 58 | 58 | 64 |
| C$_2$ concentration | [mol-%] | 15.2 | 9.4 | 9.0 | 2.2 |
| H$_2$/C$_2$ ratio | [mol/kmol] | 0.04 | 0.06 | 0.17 | 1200 |
| split | [wt-%] | 100 | 52 | 50 | 47.0 |
| MFR$_2$ | [g/10 min] | n.d. | n.d. | 9.3 | 320.0 |
| MFR$_{21}$ | [g/10 min] | n.a. | 4.2 | n.d. | n.a. |
| density | [kg/m$^3$] | | 950 | 963 | 973 |
| Gas Phase Reactor | | | | | |
| temperature | [° C.] | Not in use | 80 | 80 | 85.0 |
| pressure | [bar] | | 20 | 20 | 19 |
| C$_2$ conc. | [mol-%] | | 56 | 55 | 2.8 |
| H$_2$/C$_2$ ratio | [mol/kmol] | | 0.15 | 0.12 | 35 |
| C$_4$/C$_2$ ratio | [mol/kmol] | | n.a. | n.a. | 65 |
| C$_6$ feed | [kg/h] | | 0 | 1.6 | 0 |
| C$_6$/C$_2$ ratio | [mol/kmol] | | n.a. | 6.0 | n.a. |
| split | [wt-%] | | 48 | 50 | 52 | n.a. not applicable; n.d. not determined

TABLE 2

| Final properties | | Ex. 1 | Ex. 2 | CE 3 | CE 4 |
|---|---|---|---|---|---|
| MFR$_5$ | [g/10 min] | 0.2 | 0.2 | 2.4 | 0.3 |
| MFR$_{21}$ | [g/10 min] | 1.5 | 1.7 | 22.5 | 11.1 |
| M$_n$ | [g/mol] | 88200 | 102000 | 33900 | 6700 |
| M$_w$ | [g/mol] | 254000 | 258000 | 157000 | 329000 |
| MWD (M$_w$/M$_n$) | — | — | 2.9 | 2.5 | 4.6 | 49 |
| Density | [kg/m$^3$] | 948.0 | 947.7 | 946.5 | 950 |
| Taber abrasion | [mg/1000 cycles] | 3.7 | n.d | n.d. | 14.1 |
| Ball cratering wear coefficient × 10$^4$ | [mm$^3$/mN] | 2.82 | n.d | n.d. | 3.99 |
| Charpy at −40° C. | [kJ/m$^2$] | 150 | 131 | 12 | 18(8) |
| Charpy at −20° C. | [kJ/m$^2$] | 146 | 139 | 17 | 9 |
| Charpy at 0° C. | [kJ/m$^2$] | 143 | 140 | 21 | 14 |

TABLE 2-continued

| Final properties | | Ex. 1 | Ex. 2 | CE 3 | CE 4 |
|---|---|---|---|---|---|
| Charpy at 23° C. | [kJ/m$^2$] | 131 | 131 | 28 | 18 |
| tensile stress at break −45° C. | MPa | 50 | 54 | 21 | 24 |
| tensile strain at break −45° C. | % | 387 | 426 | 156 | 222 |
| tensile stress at yield −45° C. | MPa | 40 | 41 | 38 | 45 |
| tensile strain at yield −45° C. | % | 7 | 7 | 6 | 5 |
| tensile stress at break 23° C. | MPa | 31 | 32 | 37 | 40 |
| tensile strain at break 23° C. | % | 715 | 718 | 716 | 793 |
| tensile stress at yield 23° C. | MPa | 27 | 27 | 26 | 28 |
| tensile strain at strain 23° C. | % | 10 | 10 | 8 | 7 | n.a. not applicable; n.d. not determined

The invention claimed is:

1. A pipe coated with a composition comprising
   (A) an ethylene homopolymer resin which has been prepared by using a single-site catalyst,
   wherein the amount of component (A) is not less than 80 wt % of the composition,
   further characterized in that
   component (A) has an MFR$_{21}$, measured according to ISO 1133 at 190° C. and under a load of 21.6 kg, from 0.01 to 20 g/10 min, a molecular weight distribution (MWD) of 1 to 5, and a density of at least 940 kg/m$^3$, and is unimodal.

2. A pipe coated with a composition comprising
   (A) an ethylene homopolymer resin which has been prepared by using a single-site catalyst,
   wherein the amount of component (A) is not less than 80 wt. % of the composition,
   further characterized in that
   component (A) has an impact strength at −40° C. of at least 80 kJ/m$^2$ in a Charpy notched test according to ISO 179-1/1eA:2000 with a pendulum energy of 15 J, a molecular weight distribution (MWD) of 1 to 5, and a density of at least 940 kg/m$^3$, and is unimodal.

3. The pipe according to claim 2, wherein component (A) has an MFR$_{21}$, measured according to ISO 1133 at 190° C. and under a load of 21.6 kg, from 0.01 to 20 g/10 min.

4. The pipe according to claim 1 or 2, wherein the amount of component (A) is not less than 85 wt. % of the composition.

5. The pipe according to claim 1 or 2, which is a steel pipe.

6. A method for coating a pipe with a composition comprising
   (A) an ethylene homopolymer resin which has been prepared by using a single-site catalyst,
   wherein the amount of component (A) is not less than 80 wt. % of the composition,
   further characterized in that
   component (A) has an MFR$_{21}$, measured according to ISO 1133 at 190° C. and under a load of 21.6 kg, from 0.01 to 20 g/10 min, a molecular weight distribution (MWD) of 1 to 5, and a density of at least 940 kg/m$^3$, and is unimodal.

7. A method for coating a pipe with a composition comprising
   (A) an ethylene homopolymer resin which has been prepared by using a single-site catalyst,
   wherein the amount of component (A) is not less than 80 wt. % of the composition,
   further characterized in that
   component (A) has an impact strength at −40° C. of at least 80 kJ/m$^2$ in a Charpy notched test according to ISO 179-1/1eA:2000 with a pendulum energy of 15 J, a molecular weight distribution (MWD) of 1 to 5, and a density of at least 940 kg/m$^3$, and is unimodal.

8. The method according to claim 6 or 7, further characterized in that the article is a steel pipe.

9. The method according to claim 8, further characterized in that the composition is used as topcoat material for steel pipes for transport of oil or gas.

* * * * *